United States Patent [19]
Dowdy et al.

[11] 3,920,208
[45] Nov. 18, 1975

[54] PIPE CLAMP EMPLOYING ELECTROLYTIC CORROSION AND NOISE PREVENTIVE MEANS

[76] Inventors: Leroy D. Dowdy, 4122 N. 48th Drive; Basil D. Ray, 4731 W. Fairmount, both of Phoeniz, Ariz. 85031

[22] Filed: Feb. 4, 1974

[21] Appl. No.: 439,022

[52] U.S. Cl............ 248/56; 174/138 R; 174/153 G; 248/72; 248/73; 403/240; 403/347
[51] Int. Cl.² ......................................... F16L 5/00
[58] Field of Search ............ 248/54, 56, 57, 73, 72, 248/228, 201, 68 R; 24/73 C, 73 SA, 81 C, 81 CR; 403/347, 240; 137/357, 360; 174/65 G, 152 G, 153 G, 154, 155, 138 R; 16/2

[56] References Cited
UNITED STATES PATENTS

| 501,439 | 7/1893 | Reznor | 24/73 SA |
|---|---|---|---|
| 1,010,342 | 11/1911 | Atwood | 174/155 |
| 2,067,403 | 1/1937 | Lea | 52/220 X |
| 2,451,699 | 10/1948 | Twaroski | 248/54 R |
| 2,458,670 | 1/1949 | Young | 248/56 |
| 2,542,442 | 2/1951 | Weber | 248/68 R |
| 2,634,930 | 4/1953 | Tormo | 248/68 R |
| 2,651,826 | 9/1953 | Carpenter et al. | 24/81 C X |
| 2,985,932 | 5/1961 | Windish | 24/81 C |
| 3,050,801 | 8/1962 | Downey | 24/81 C |
| 3,226,468 | 12/1965 | Patton et al. | 248/68 R X |
| 3,521,842 | 7/1970 | Opperthauser | 248/54 R |
| 3,817,688 | 6/1974 | Shadley | 248/56 X |

FOREIGN PATENTS OR APPLICATIONS

| 849,761 | 9/1960 | United Kingdom | 174/153 G |
| 651,872 | 2/1929 | France | 248/228 |
| 1,101,275 | 10/1955 | France | 248/68 R |

*Primary Examiner*—Roy D. Frazier
*Assistant Examiner*—Rodney H. Bonck
*Attorney, Agent, or Firm*—Warren F. B. Lindsley

[57] ABSTRACT

An improved pipe clamp assembly for the support and the electrical and mechanical isolation of a metallic pipe from metallic studs or structural supporting members to prevent electrolytic corrosion and audible noise due to mechanical vibrations.

3 Claims, 6 Drawing Figures

3,920,208

PIPE CLAMP EMPLOYING ELECTROLYTIC CORROSION AND NOISE PREVENTIVE MEANS

BACKGROUND OF THE INVENTION

The limited supply of lumber for building purposes in relationship to the world market and the rising costs for labor involved in cutting, processing, handling and shipping of lumber have caused builders and architects to look for other materials that might be substituted for wood as structural members.

A recent development utilizes fabricated steel studs in place of conventional wooden two-by-four studding for framing in the walls of houses and other building structures. Such steel studs are typically made from sheet steel which is formed into lightweight but sturdy channels or beams having a shallow U-shaped cross-sectional configuration or hollow tubular beams having square or rectangular cross-sectional configurations. Openings in the channels along their lengths serve as passageways for pipes and conduits associated with plumbing and electrical wiring.

When metallic pipes or conduits are installed in walls in which such steel strucutral members are utilized, two problems arise. The first is that vibrations of the building structure caused by wind or passing heavy trucks, for example, may cause the pipes to rattle against the steel studs, thereby producing undesirable audible noise. The second problem involves the engagement of dissimilar metals such as the contact of copper pipes with steel studs, especially in the presence of moisture, which is likely to form as condensation on the copper pipes. In this situation, there is a tendency for electrolytic corrosion to occur which might, over a long period of time, cause the copper plumbing or a contacting steel pipe to fail. Because the mechanical vibrations can cause abrasion of the contacting metallic surfaces and the wearing away of any initial protective coatings on such surfaces, the potential for electrolytic corrosion increases.

It is important, therefore, that an effective, convenient and inexpensive means be provided for supporting the pipes and conduits in a way that will prevent direct physical contact between the pipes or conduit and the steel studs through which they are passed, thereby eliminating audible noises and electrolytic corrosion.

FIELD OF THE INVENTION

This invention is particularly directed to a supporting assembly for holding pipes or conduits within an aperture in a metallic stud or structural support member in such a way as to prevent physical contact between these members, thereby eliminating audible noises due to vibrations and corrosion due to galvanic action.

DESCRIPTION OF THE PRIOR ART

In the past, builders have attempted to prevent such problems by wrapping the pipes with a suitable insulating material that was intended to withstand the mechanical stresses and abrasive actions involved or have applied bushings lined with felt at the point of physical contact. The wrapping and bushing mounting procedures are time-consuming and expensive, and in addition, brackets or clamps must also be used to support the pipes. Even when such measures are taken, however, it is questionable that available insulating materials or bushings for wrapping such pipes or conduits can withstand the concentrated mechanical stresses present at the point of contact between the pipe and the sharp edges of the steel supporting members.

In accordance with the invention claimed, a new and improved supporting device is provided for securing a pipe or conduit within an aperture in the web of a steel structural support member in such a way as to prevent audible noise and electrolytic corrosion. The device is effective, inexpensive and conveniently installed.

SUMMARY OF THE INVENTION

It is, therefore, one object of this invention to provide an improved pipe clamping and insulating assembly for supporting pipes or conduits within apertures in the web of a steel structural support member.

Another object of this invention is to provide an improved pipe clamping and supporting device which serves as an insulating means between the pipe and a steel supporting member.

A further object of this invention is to provide an improved pipe clamping and supporting device which prevents metal to metal contact between the supported pipes and the steel structural support member, thereby eliminating excessive audible noise as the result of mechanical vibrations or electrolytic corrosion due to galvanic action.

A further object of this invention is to provide such a pipe clamping device which may be installed in any corner of an aperture such as, for example, a rectangular or keyhole-type aperture in a web of a steel supporting member.

A further object of this inention is to provide such an improved pipe clamping device that is both inexpensive to manufacture and convenient to install.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing, in which.

DESCRIPTION OF THE PREFERRED EMBODIMENT

Figure 1:
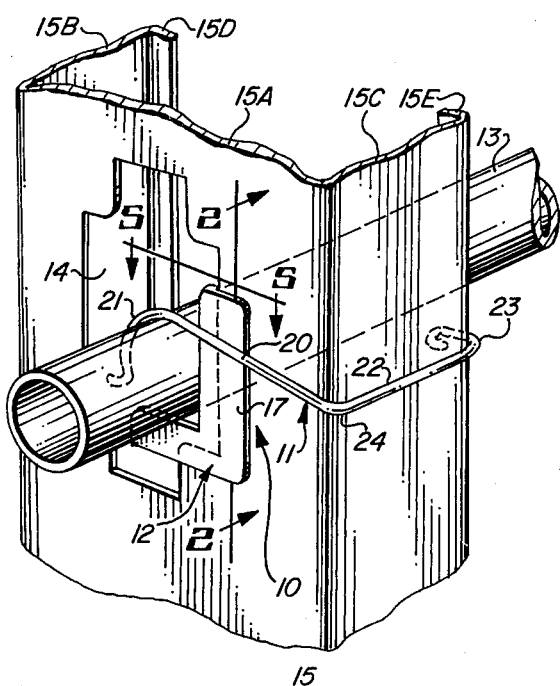
FIG. 1 is a fragmentary perspective view of a pipe secured within an opening in a metallic structural support member by means of a pipe clamp-and-guard assembly comprising this invention.

Referring more particularly to the drawing by characters of reference, FIGS. 1–6 disclose a pipe clamp and guard combination or assembly 10 embodying this invention comprising a wire pipe clamp 11 and an L-shaped pipe supporting and galvanic insulator 12, the clamp and guard assembly 10 being secured to a pipe 13 in position within any suitably shaped opening 14 in a metallic structural support member or stud 15.

The clamp and guard assembly 10 is desired for use with any suitable shaped metallic structural stud 15 shown in FIG. 1, for purposes of example, as having a U-shaped cross-sectional configuration. It should be recognized that hollow tubular studs having square or rectangular cross-sectional configuration may also be used. Stud 15 may be of steel, aluminim or other suitable material and it may be formed by rolling and bending or by extrusion. The U-shaped channel shown in FIG. 1 has the approximate outer dimensions of the common stud of wood known as a two-by-four, although studs of any size may be used. The opening in stud 15 may be a simple rectangular opening, or of various other shapes or configuration as explained above, such as the cross-shaped opening 14 shown. Such openings are provided at regular intervals along the length of stud 15 in its originally manufactured form so that it is not necessary to cut the openings at the building site prior to the installation of the pipes.

Figure 2:
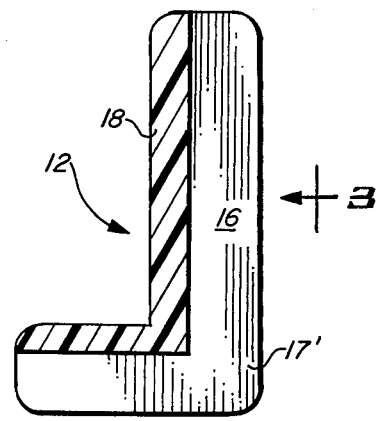
FIG. 2 is a cross-section of the L-shaped pipe guard shown in FIG. 1 taken along line 2—2.
Figure 3:
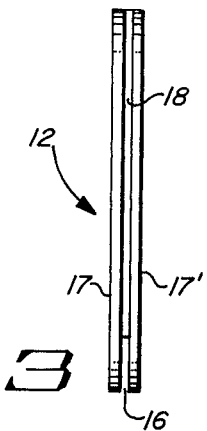
FIG. 3 is an end view of the pipe guard shown in FIG. 2 taken in the direction indicated by the arrow 3.
Figure 5:
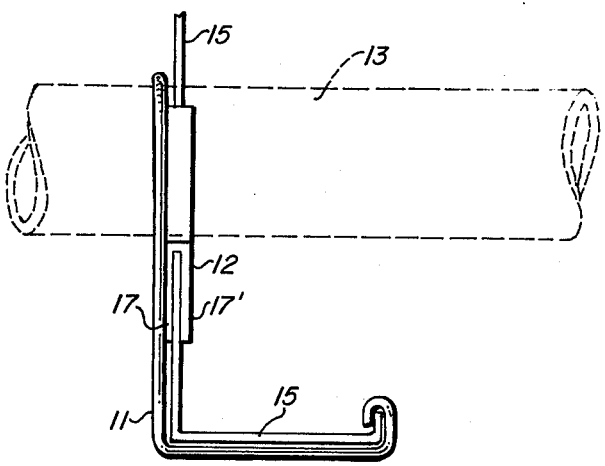
FIG. 5 is a partial cross-sectional view of the pipe clamp-and-guard assembly shown in FIG. 1 taken along lines 5—5.

The pipe guard 12 is a flat L-shaped corner grommet which may be molded in one piece from plastic, rubber or other suitable electrical insulating material having the necessary mechanical strength and resilience. A deep slot 16 running along the outer edges of guard 12 nearly splits its L-shaped configuration into two closely spaced parallel L-shaped members 17 and 17' joined by a narrower L-shaped bridging member 18 which runs along the inner edges of guard 12 as shown in FIG. 2. When guard 12 is installed in a square corner of the opening 14, the slotted opening in guard 12 fits over the inner edge of opening 14 as shown in FIGS. 1 and 5 with sufficient interference to provide a gripping action between guard 12 and the surfaces of structural member or stud 15 so that guard 12 will hold itself in position during the subsequent installation of pipe 13 and clamp 11.

Pipe clamp 11 is formed of spring steel in the general configuration of an upper case letter L. At the upper extremity of the longer or vertical segment 20 of the L configuration, an arcuate bend 21 is formed having a radius of curvature approximately equal to the radius of the pipe to be secured, the arc of this bend lying in a plane which perpendicularly intersects the plane of the L configuration of clamp 11 along the vertical segment 20. At the outer extremity of the shorter or horizontal segment 22 of the L configuration a hook 23 is formed by means of two bends lying in the plane of the L configuration. The first of the two bends is a right angle bend leading upwardly as shown. The second bend is an arcuate bend of a smaller radius which turns the end of the clamp an additional 180 degrees turning inwardly toward segment 21 and then downwardly toward member 22.

As previously mentioned, the steel support stud 15 may be in the form of a channel with a shallow U-shaped cross-sectional configuration or it may be a hollow tubular stud having a square or rectangular cross-sectional configuration having an aperture 14 located at a suitable or various places along its length. This stud may be of the size of a normal stud known as a two-by-four wooden structural member well known in the building art or any size stud. The two vertical and parallel segments 15B and 15C of a segment 15A of stud 15 compare substantially dimensionally to the nominal sides of the conventional two-by-four wooden studs. Running along the open edges of the channel are flanges 15D and 15E, flange 15D extending perpendicularly inwardly from the edge of face 15B and flange 15E extending perpendicularly inwardly from the edge of face 15C.

When clamp 11 is installed as shown in FIG. 1 hook 23 grips the edge of flange 15E and by virtue of the right angle bend associated with hook 23, the lower segment 22 of clamp 11 follows the right angle formed by flange 15E relative to segment 15C so that the main portion of segment 22 lies flat against face 15C of stud 15.

Figure 4:
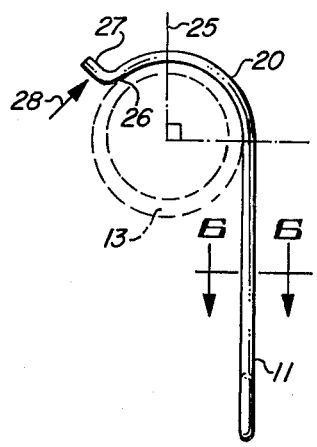
FIG. 4 is a view of the pipe clamp in position over the pipe being secured, the view of FIG. 4 being taken from the left-hand end of the pipe as shown in FIG. 1.

The right angle bend at corner 24 which is the junction between segments 20 and 22 allows conformance between clamp 11 and stud 15 so that with the length of segment 22 only slightly longer than the width of face 15C segment 20 lies immediately next to and parallel with face 15A of stud 15. As arcuate bend 21 passes over pipe 13, it makes physical contact therewith from a point of tangency at the top of pipe 13 where the straight portion of segment 20 first begins to break into arcuate bend 21, and the area of contact continues on along the length of the arcuate bend for a distance corresponding to an arc which is substantially greater than 90°. The continuation of the contact area beyond the ninety degree point 25 as shown in FIG. 4 affords a gripping action which prevents end 26 of arcuate bend 21 from slipping free from pipe 13 after it has been installed. At the very end of arcuate bend 21 a short outward bend 27 terminates clip 11 and serves as a grip against which pressure may be applied in the direction 28 to free clamp 11 from its grip on pipe 13 if it is desired to remove clamp 11 after it has been installed.

Figure 6:
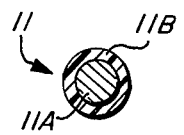
FIG. 6 is a cross-sectional view of the clamp shown in FIG. 4 taken along lines 6—6.

The cross section view of clamp 11 shown in FIG. 6 illustrates that the spring steel 11A of clamp 11 is covered by an outer coating which may be plastic or rubber or any other suitable tough, resilient and electrically insulating material which is impervious to moisture.

When pipe 13 is held in position within aperture 14 of stud 15 by pipe clamp and guard assembly 10, as shown in FIGS. 1 and 5, it is seen that no points of direct physical contact exist between the metallic pipe 13 and metallic structural member or stud 15. The absence of such direct physical contact is due to the interposition of guard 12 between pipe 13 and the edges of aperture 14 and also to the insulating coating 11B over metal clamp 11. The desired electrical and mechanical isolation of metal parts 13 and 15 is thus achieved so that electrolytic corrosion and audible noise resulting from mechanical vibrations are both prevented according to the desired objects of this invention.

The extremely simple operations of installing guard 12 in any appropriate corner of aperture 14 either before or after the introduction of pipe 13 followed by the installation of clamp 11 may be performed very quickly. The simplicity and the very minimal time required for these operations coupled with the very low cost of only a few cents each for guard 12 and clamp 11 result in a very low total cost for materials and labor.

While only one embodiment of the invention has been shown in the drawing and described in the foregoing paragraphs, it will be apparent to those skilled in the art that various changes and modifications may be made therein without departing from the spirit of the invention or from the scope of the appended claims.

What is claimed is:

1. An improved pipe clamping assembly for supporting a pipe in an opening in a metallic building stud comprising in combination:
an L-shaped pipe guard formed of a flat insulating material,
said guard being slotted along the outside one half of its L-shaped peripheral configuration for receiving in a part of its slot the edges of the opening in the metallic support member, whereby a pipe may be positioned to rest between the legs of said L-shaped configuration, and
a right angular clamp comprising a pair of segments, one segment having its free end curved in the same plane as said one segment for fitting around a pipe, the free end of the other segment being curved at a right angle thereto within the same plane as said other segment and extending in the same direction as said one segment for fitting around the metallic building stud,
said clamp being positioned for holding a pipe between the legs of the L-shaped pipe guard fitted over the edge of an aperture in the metallic building stud and around at least a part of the building stud in a tight fitting arrangement.

2. The improved pipe clamping assembly set forth in claim 1 wherein:
said right angular clamp comprises a spring steel wire covered along its length with an insulating plastic covering.

3. The improved pipe clamping assembly set forth in claim 2 wherein:
said free end of said other segment being turned back on its self for fitting around the edge of a flange of the metallic building stud.

* * * * *